Oct. 14, 1958
W. W. MUMFORD ET AL
2,855,887
SPRING CONTROLLED CONDITION RESPONSIVE
INDICATING MECHANISM
Filed Dec. 13, 1954
2 Sheets-Sheet 1
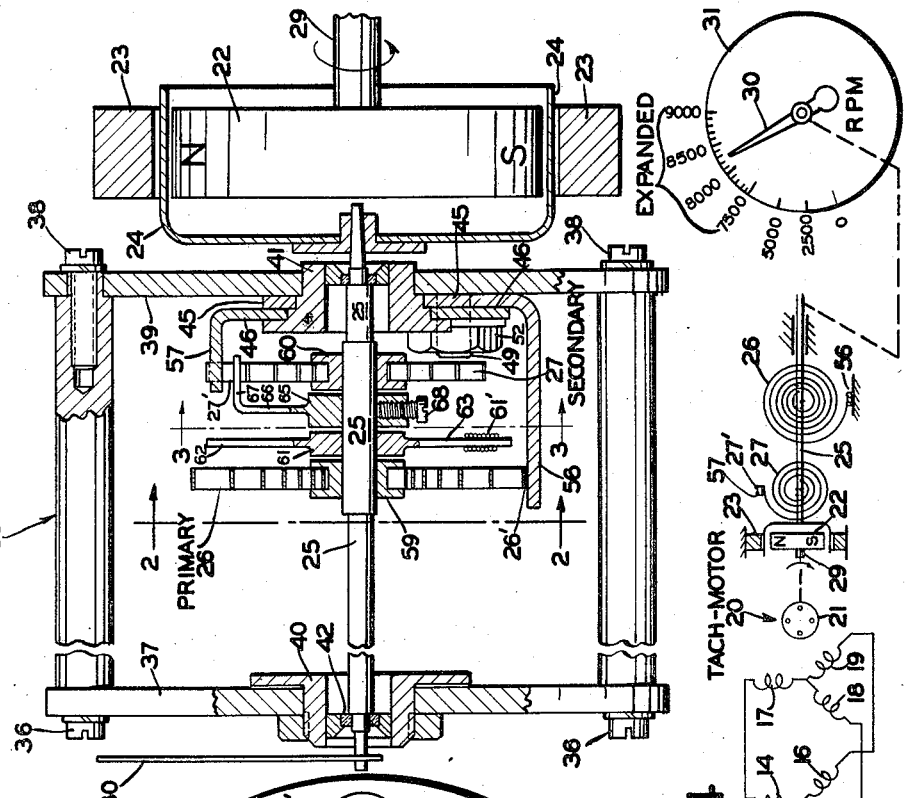
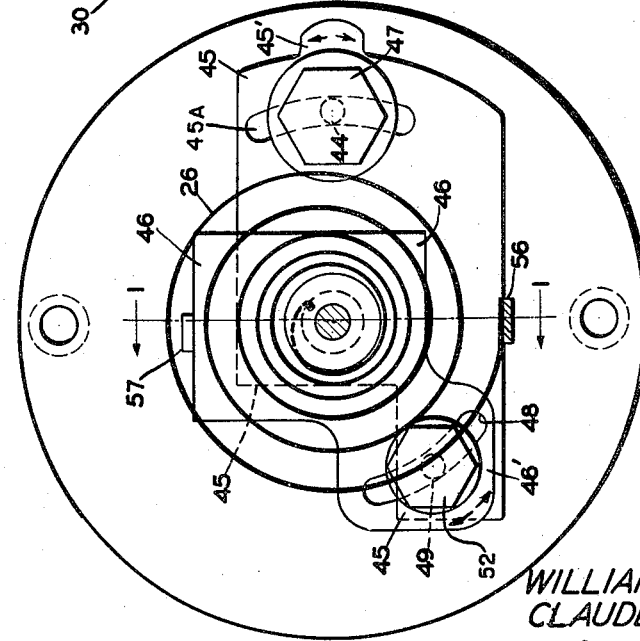
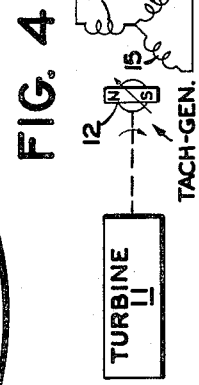
*INVENTORS*
WILLIAM W. MUMFORD
CLAUDE E. PETRUZZI
BY Tyler S Roundy
ATTORNEY Oct. 14, 1958    W. W. MUMFORD ET AL    2,855,887
SPRING CONTROLLED CONDITION RESPONSIVE
INDICATING MECHANISM
Filed Dec. 13, 1954      2 Sheets-Sheet 2
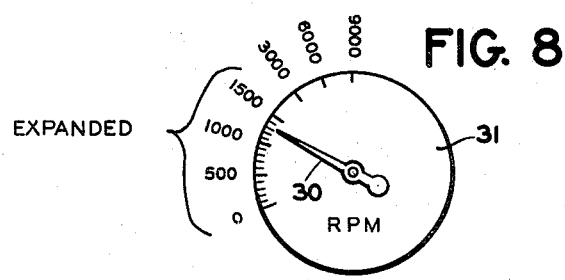
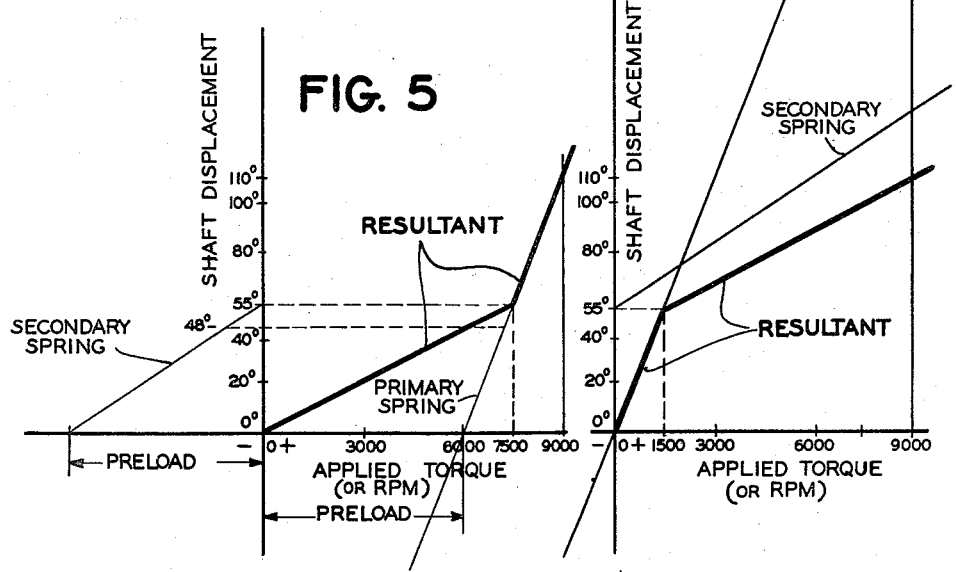
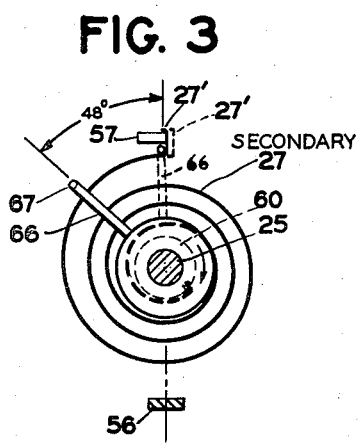
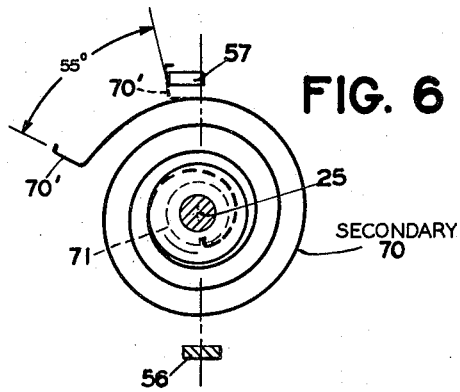
INVENTORS
WILLIAM W. MUMFORD
CLAUDE E. PETRUZZI
BY Tyler S Roundy
ATTORNEY

United States Patent Office 2,855,887
Patented Oct. 14, 1958

2,855,887

SPRING CONTROLLED CONDITION RESPONSIVE INDICATING MECHANISM

William W. Mumford, Park Ridge, N. J., and Claude E. Petruzzi, Bronxville, N. Y., assignors to Bendix Aviation Corporation, Teterboro, N. J., a corporation of Delaware Application December 13, 1954, Serial No. 474,893

6 Claims. (Cl. 116—129)

This invention relates to displaceable apparatus and particularly to improvements in angularly displaceable shaft arrangements controlled or restrained by flexible means in indicating instruments of a type such as disclosed by U. S. Patent No. 2,619,933 granted December 2, 1952 to Malcolm K. Gordon, Jr. and Kurt E. Lishick and assigned to Bendix Aviation Corporation. The invention relates especially to improvements in spring-controlled or spring-restrained shaft arrangements employed with condition-sensing apparatus or with indicating apparatus.

In certain prior constructions where a condition-sensing device develops a variable torque to control the angular position of a shaft or where a variable torque is applied to a shaft to control the angular position of an indicator, a single restraining spring is employed. In similar prior constructions such as shown in the U. S. Patent No. 2,619,933 one or more additional springs are employed with the first spring so that all springs impart torque to the shaft concurrently for all values of the external torque applied to the shaft. In these prior constructions the change in the angular position of the shaft for a given change in the externally applied torque is substantially the same throughout the entire range of values of the applied torque. Accordingly, the sensitivity of control or indication derived from the shaft is the same over the entire range of values of the externally applied torque, and similarly over the entire range of values of the condition being sensed except that the sensitivity would progressively vary if a logarithmic function is involved.

Stated differently, in the prior arrangements of indicating instruments such as disclosed in the aforenoted U. S. Patent No. 2,619,933 the characteristic of the shaft relating shaft displacement with the externally applied torque follows the same one law, whether linear or non-linear, over the total range of values of the externally applied torque and over the total range of values of the condition being measured. In other words, the curve relating shaft displacement as a function of the externally applied torque or of the condition being measured does not undergo an abrupt change in slope at some intermediate value of the externally applied torque or of the condition being measured.

When the shaft is employed to control an indicator pointer, the associated dial is calibrated, linearly or non-linearly as the case may be, so as to conform to said one law. One difficulty arising in such prior arrangements of the U. S. Patent No. 2,619,933 stems from the fact, previously mentioned, that the sensitivity or deflection rate of the shaft is substantially the same, or else progressively varied, over the total range of values of the sensed condition. With a sensitivity which is the same throughout the total range, the dial indication presented to the observer cannot be read with any greater accuracy in one working portion of the total range of sensed condition values than in another working portion of the total range. With a sensitivity which varies progressively or logarithmically over the total range, the accuracy of reading deteriorates progressively over the dial and is therefore unsuited for many applications.

The above limitations as to shaft sensitivity of indicating instruments of the type disclosed in the aforenoted U. S. Patent No. 2,619,933 become particularly significant in control and indicating systems for modern aircraft. It has recently been found desirable to provide a single dial and pointer which not only covers the total range of values of a condition being sensed, for example engine R. P. M. or rate of fuel flow, but which is also capable of automatically presenting to the pilot a uniformly expanded indication over a selected more critical portion of the total range of the sensed condition without first requiring the pilot to make a preliminary manual range adjustment or range-switching operation.

The present invention is also concerned with the problem of providing a selected range wherein the shaft does not move in response to changes in the externally applied torque or in the value of the sensed condition.

It is an object of the present invention to provide improved displaceable apparatus employing flexible or spring restraining means.

It is another object of the invention to provide improved displaceable apparatus utilizing a plurality of flexible elements or springs.

It is another object of the invention to provide a yieldably restrained shaft with a spring arrangement for imparting to the shaft a greater sensitivity or deflection rate for one portion of the total range of values of the external torque applied to the shaft than for another portion of said total range.

It is another object of the invention to provide in condition-sensing apparatus including a shaft which is angularly displaced in accordance with the condition being sensed, a spring arrangement for imparting to the shaft a greater sensitivity or deflection rate for one portion of the total range of values of the sensed condition than for another portion of said total range.

It is another object of the invention to provide condition-responsive apparatus with flexible means or spring means arranged so that an output shaft has a uniformly expanded sensitivity or deflection rate for one portion of the total range of values of the sensed condition which is greater than for another portion of said total range.

It is another object of the invention to provide a yieldably restrained shaft with a spring arrangement for imparting to the shaft a uniformly expanded sensitivity or deflection rate for one portion of the total range of values of the external torque applied to the shaft which is greater than for another portion of said total range.

It is another object of the invention to provide a yieldably restrained shaft with a spring arrangement so that the shaft has at least two linear sensitivities or deflection rates of different slope corresponding to different portions of the total range of values of external torque applied to the shaft.

It is a further object of the invention to provide condition-responsive apparatus with flexible means or spring means arranged so that an output shaft has at least two linear sensitivities or deflection rates of different slope corresponding to different portions of the total range of values of the sensed condition.

It is a further object of the invention to provide a spring arrangement which causes a shaft to have a uniform sensitivity or deflection rate in a lower portion of the total range of values of the external torque applied to the shaft, or in a lower portion of the total range of values of a sensed condition and which causes the shaft to have an expanded uniform sensitivity or deflection rate in an upper portion of such total range.

It is a further object of the invention to provide a spring arrangement which causes a shaft to have a uniform sensitivity or deflection rate in an upper portion of the total range of values of the external torque applied to the shaft, or in an upper portion of the total range of values of a sensed condition, and which causes the shaft to have an expanded uniform sensitivity in a lower portion of such total range.

It is a further object of the invention to provide apparatus for measuring and indicating a condition wherein the indicator dial has an expanded uniformly graduated scale portion corresponding to one portion of the total range of values of the condition being measured and flexible means or spring means are provided to cause a pointer-control shaft to have an expanded uniform sensitivity or deflection rate in said one portion of the total range of values of the measured condition.

It is a further object of the invention to provide a predetermined range wherein a resiliently restrained shaft does not move in response to changes in the value of an externally applied torque or in the value of a sensed condition to which the shaft normally responds.

The foregoing and other objects and advantages of the invention will appear more fully hereinafter from a consideration of the detailed description which follows, taken together with the accompanying drawings wherein certain forms of the invention are illustrated by way of example. It is to be expressly understood, however, that the drawings are for illustration purposes only and are not to be construed as defining the limits of the invention.

In the drawings where like reference numerals refer to like parts,

Fig. 1 is a side elevational view partially in section along the line 1—1 of Fig. 2 and illustrates in accordance with the invention one form of dual-sensitivity mechanism including a pair of springs and a shaft associated with torque-applying means in the form of a drag cup device;

Fig. 2 is a front view of the primary spring and base structure of Fig. 1 as seen along the line 2—2 with certain parts omitted for clarity;

Fig. 3 is a front view of the secondary spring and adjustable stop of Fig. 1 as seen along the line 3—3 with the base structure omitted, the secondary spring being adapted to provide expanded shaft sensitivity in the upper range;

Fig. 4 is a simplified diagrammatic illustration of electro-mechanical remote indicating apparatus including the dual-sensitivity mechanism of Figs. 1–3 for providing a remote indication of the speed of a turbine engine, the indication being uniformly expanded in the upper range portion;

Fig. 5 represents graphically the output shaft displacement vs. applied torque (or engine R. P. M.) characteristic obtained for the apparatus of Figs. 1–4;

Fig. 6 is a front view similar to Fig. 3 and illustrates a modified secondary spring arranged in conjunction with a primary spring to provide expanded shaft sensitivity in the lower range;

Fig. 7 represents graphically the output shaft displacement vs. applied torque (or engine R. P. M.) characteristic obtained for the modification of Fig. 6; and Fig. 8 illustrates diagrammatically a dial having a uniformly expanded lower range portion for use in the indicator in accordance with the modification of Figs. 6 and 7.

In the drawings and description that follows the invention is applied by way of example to tachometer apparatus for measuring and indicating the speed of an engine. It will be apparent that the invention is equally applicable to the measurement of other variable conditions such as rate of fuel flow or fluid differential or gage pressure. Turning briefly to Fig. 4, there is indicated generally at 11 a turbine engine whose output shaft is mechanically coupled to drive the permanent magnet rotor 12 of a conventional tachometer generator 13 having its stator windings 14, 15 and 16 connected back-to-back with the corresponding stator windings 17, 18 and 19 of a conventional tachometer induction motor 20 which has an iron rotor 21 provided with embedded copper bars.

Continuous rotation of the generator rotor results in a rotating stator field which is repeated in the motor to induce eddy currents in the motor rotor whereby the latter continuously rotates at a speed determined by the speed of the engine. The motor rotor is mechanically coupled to drive a permanent magnet 22 of a conventional slip-coupling or eddy-current drag-cup device 24 which includes an iron ring 23 to provide a return path for the flux and a copper or aluminum drag cup 24 which is disposed between the magnet 22 and ring 23. Rigidly attached to the drag cup 24 is a shaft 25 supported in suitable bearings and yieldably restrained by spring means 26, 27 about to be described in detail.

The torque or turning effect developed by induction in the drag cup 24 is directly proportional to the speed of rotation of magnet 22, of motor 20 and of the turbine engine speed, which is the condition being sensed. The greater the engine speed, the greater will be the torque and hence the greater will be the angular displacement of the drag cup and shaft 25 from its angular zero position corresponding to zero engine speed. Since linear spring means is employed to restrain shaft 25, the angular displacement of shaft 25 will be a linear function of the torque applied by drag cup 24 to shaft 25 and accordingly the angular displacement of shaft 25 will also be a linear function of engine speed (R. P. M.). However, due to the novel spring arrangement about to be described the linear characteristic curve relating the angular displacement or position of shaft 25 to the value of the torque applied by drag cup 24 will have one constant slope in the lower range of engine speeds (0 to 7500 R. P. M.) and a constant but greater slope in the upper range of engine speeds (7500 to 9000 R. P. M.). Shaft 25 is mechanically coupled to displace angularly a pointer 30 with respect to a dial 31 having a scale calibrated in units of the condition being measured, viz. engine R. P. M. The graduations in the lower portion of the scale between zero and 7500 R. P. M. are uniformly spaced along an arc of 55°, and the graduations in the upper portion of the scale between 7500 R. P. M. are uniformly spaced along an adjoining arc of 55°. It will be noted that the upper scale portion is uniformly expanded as compared to the lower scale portion.

Turning now to Figs. 1–3, there is provided a rigid frame structure 35 having a rigid plate 37 secured to its front end by screws 36 and having a rigid base member 39 secured to its rear end by screws 38. Fitted rigidly into central apertures in plate 37 and base 39 are bearing holder members 40 and 41, respectively, to support the jewel bearings 42 for shaft 25. Integral with base member 39, or threaded therein, is a stud 44 indicated by dotted lines in Fig. 2. Adjacent to base member 39 is an adjustable inner plate 45 mounted for initial angular adjustment about an annular stepped portion of member 41. Plate 45 has an arcuate slot 45A through which stud 44 projects. A nut 47 is threaded on the outer end of stud 44 to hold plate 45 rigidly, but releasably, to base 39 after adjustment. Adjacent to plate 45 is an adjustable outer plate 46 which is also mounted for initial angular adjustment about an annular stepped portion of member 41. Plate 46 has a finger-grip portion 46′ provided with an arcuate slot 48 which receives a stud 49 integral with inner plate 45. A nut 52 is threaded on the outer end of stud 49 to hold plate 46 rigidly, but releasably, to plate 45 after plate 46 has been adjusted.

Integral with plate 45 is an outwardly projecting portion 56 which has its outer end soldered to the outer end 26' of the primary spiral hairspring 26 to serve as a permanent stop for spring 26. Integral with plate 46 is an outwardly projecting portion 57 which serves as a stop for the free outer end 27' of the secondary spiral hairspring 27. Springs 26 and 27 are wound oppositely so as to exert opposing torques upon shaft 25. The inner end of primary spring 26 is hooked rigidly into place in an annular groove in a hub 59 mounted rigidly on shaft 25, while the inner end of secondary spring 27 is hooked rigidly into place in an annular groove in a hub 60 mounted rigidly on shaft 25. In the particular construction illustrated stop 57 on plate 46 is located approximately 180° from stop 56 on plate 45.

With nut 47 tight and nut 52 loose, the finger grip portion 46' may be manually adjusted to turn plate 46 and stop 57 about shaft 25 until stop 57 occupies the desired position relative to stop 56. Nut 52 is then tightened to fix the angular positions of stops 56 and 57 relative to each other. For zero-adjustment of shaft 25 and pointer 30 to the zero angular position corresponding to zero applied torque from drag cup 24 when the engine is at rest, nut 47 is now loosened and the finger-grip portion 45' of plate 45 is manually adjusted to turn plate 45, and hence plate 46 and stops 56 and 57, about shaft 25 until the pointer 30 lines up with the zero graduation on dial 31. As indicated in Fig. 5, springs 26 and 27 will have been pre-stressed so that when the external torque applied to shaft 25 from drag cup 24 is zero, the torques which springs 26 and 27 apply to shaft 25 are equal and opposite to produce an effective restraining torque on shaft 25 which is zero.

The operation of the apparatus of Figs. 1–4 may be understood more clearly by reference to the curve of Fig. 5. In order to obtain a more pronounced expansion of the sensitivity of shaft 25 for the upper range of torques applied by drag cup 24 and for the upper range of engine R. P. M. values, the spring rate or strength of the secondary spring 27 is made substantially greater than the spring rate of primary spring 26. For example, secondary spring 27 may be constructed so as to have a spring rate which is approximately four times that of primary spring 26.

As the engine R. P. M. progressively increases from zero and the external torque applied to shaft 25 from drag cup 24 progressively increases from zero, primary spring 26 progressively winds up farther so as to exert a progressively increasing restraining torque upon shaft 25. At the same time the secondary spring 27, which has its free end 27' urged into engagement with stop 57, progressively unwinds so as to exert a progressively decreasing torque upon shaft 25 in opposition to the progressively increasing torque of primary spring 26. In one construction there was employed a primary spring having a spring rate of approximately 90 milligrams per millimeter per degree rotation and a secondary spring having a spring rate of approximately 360 milligrams per millimeter per degree rotation. It is to be noted that the torque imposed on shaft 25 by secondary spring 27 tends to turn shaft 25 in the same direction as the external torque applied by drag cup 24. Hence, for each new value of engine R. P. M. and drag cup torque a force or torque equilibrium condition is reached for shaft 25 and pointer 30 whereby the effective restraining torque, which is equal to the difference between the opposing torques of springs 26 and 27, balances such value of drag cup torque, so that shaft 25 and pointer 30 are at rest.

When the engine R. P. M. and drag cup torque reach an intermediate value (e. g., 7500 R. P. M.) beyond which it is desired to obtain a uniformly expanded shaft or pointer sensitivity, then at this point secondary spring 27 has been arranged to become completely unwound so that its free end 27' leaves stop 57 from this point on it is unable to exert any torque upon shaft 25 to aid the drag cup torque, or to oppose the primary restraining spring 26. Hence, in the upper range corresponding to 7500–9000 R. P. M. secondary spring 27 simply rides on shaft 25. Accordingly, in the upper range between 7500 and 9000 R. P. M. the full undiminished strength of primary spring 26 is permitted to restrain shaft 25 in opposition to the drag cup torque, primary spring 26 continuing to wind up to increase its restraining torque progressively as the drag cup torque is progressively increased. From the foregoing it will be seen that the change in angular position of shaft 25 and pointer 30 per unit change in engine R. P. M. or drag cup torque is uniformly greater in the upper R. P. M. range than in the lower R. P. M. range. Accordingly, there is presented to the observer an expanded indication of R. P. M. values in the upper R. P. M. range which permits the observer to make much more accurate readings of engine R. P. M. in the upper range, which may be more critical than the lower range.

If desired, a counterweight member may be provided to compensate for lack of symmetry and weight distribution of springs 26 and 27 and the other parts about shaft 25. The counterweight member has a hub portion 61 and four radial arms spaced 90° apart in one plane. Two of the arms 62 and 63 are illustrated in Fig. 1. Each arm carries a selected number of turns of heavy brass spring wire 61'.

In accordance with another feature of the invention there may be employed, if desired, in the apparatus of Figs. 1–4 novel means for preventing vibration of the free end of secondary spring 27 once it leaves stop 57, which means may also be adapted to provide a predetermined range of engine R. P. M. and drag cup torque values wherein shaft 25 and pointer 30 do not move in response to changes in engine R. P. M. or drag cup torque. As illustrated in Figs. 1 and 3, such means comprises an adjustable stop member 66 which is rigidly carried by a hub 65. Hub 65 is adjustably mounted on shaft 25 and is fixed to shaft 25 by tightening of a set screw 68 which is threaded through hub 65 into contact with shaft 25.

As shown in Fig. 3, stop member 66 remains out of contact with secondary spring 27 and the other elements as long as shaft 25 and pointer 30 occupy angular positions between zero and 48°. Without the presence of stop member 66 the free end 27' of secondary spring 27 would leave stop 57 when shaft 25 is at its 55° position. However, as indicated by the dotted lines in Fig. 5 for a shaft position of 48°, the provision of stop member 66 causes the free end 27' to leave stop 57 when shaft 25 is at its 48° position. When shaft 25 reaches its 48° position, it causes the outer end 67 of stop member 66 to engage the free end 27' of spring 27. At this moment the effective remaining torque in secondary spring 27 is immediately reduced to zero so that spring 27 is in effect immediately taken out of the system, even though it is not completely unwound and still has a small force remaining. This is so since the adjustable stop member 66 and the fixed end of secondary spring 27 are both rigidly attached to the same member, namely shaft 25. The effective removal of the small remaining force in spring 27 due to engagement with adjustable stop member 66 results in a static unbalance between the applied torque and the restraining torque due to primary spring 26 operating alone. This unbalance would tend to rotate shaft 25 and pointer 30 backwards (downscale) except for the presence of the fixed stop 57. As the applied drag cup torque is further increased, the static unbalance is gradually reduced to zero, at which point the free end 27' of spring 27 lifts off stop 57 and shaft 25 leaves its 48° position and again moves upscale at a deflection rate determined solely by the spring rate of primary spring 26.

A modification will now be described in accordance with the present invention to provide shaft 25 and its pointer with a uniformly greater deflection rate or sensitivity in the lower range than in the upper range. In Fig. 6 there is illustrated a secondary spring 70 which may be substituted for secondary spring 27 of Figs. 1–5. Spring 70 may be similar to spring 27 except that spring 70 is wound in the same direction as the primary spring 26 so as to exert a torque which supplements the restraining torque developed by primary spring 26. Turning to Fig. 7 it will be seen that primary spring 26 will now be initially adjusted so that at zero engine R. P. M. and zero position for shaft 25, spring 26 is completely unwound and hence exerts no restraining torque upon shaft 25. In the lower range of positions of shaft 25 between zero and 55° corresponding to the lower range of R. P. M. values between zero and 1500 R. P. M., the free end 70' of secondary spring 70 simply rides on shaft 25 and remains out of contact with stop 57. Hence, shaft 25 is restrained only by the spring rate of spring 26. However, when shaft 25 reaches its 55° position, then free end 70' of spring 70 engages stop 57 as indicated by the dotted lines. With further increase in the applied drag cup torque turning shaft 25 beyond its 55° point and throughout the upper range to its maximum position of 110°, spring 70 begins to wind up so as to develop a progressively increasing restraining torque to supplement the restraint of spring 26 imposed upon shaft 25. It will thus be seen that the sensitivity of shaft 25 and its pointer 74 has been uniformly compressed. Accordingly, by comparison with the upper range the lower range has been uniformly expanded, and the associated dial 75 shown in Fig. 8 will present an expanded indication to the observer.

Many modifications and applications are possible within the scope of the present invention. Other variable conditions may be measured and indicated with expanded sensitivity. For example, a spring arrangement with two or more sensitivities may be employed to control the displacement of a shaft which is responsive to a turbine-type fluid flowmeter, such as disclosed in U. S. Patent No. 2,602,330 or which is associated with a dual-bellows differential-pressure sensing device.

Although certain forms of the invention of the present application have been illustrated and described in detail by way of example, it is to be expressly understood that the invention is not limited thereto. Various changes may be made in the design and in the arrangement of parts without departing from the spirit and scope of the invention as defined by the appended claims as will now be understood by those skilled in the art.

We claim:

1. In a condition responsive apparatus, the combination comprising means for sensing a variable torque input condition, a yieldably restrained shaft angularly displaceable by said condition sensing means, means cooperating with said shaft for effecting a uniformly expanded indication of an upper range of values of the sensed condition and a uniformly compressed indication of a lower range of values of the sensed condition, said last-mentioned means including a primary spring operatively connected to said shaft to apply a force resiliently opposing angular movement thereof upon increase in the value of the sensed condition, a secondary spiral spring wound about said shaft, a first stop to releasably engage one end of said secondary spiral spring, said secondary spiral spring having another end fixed to said shaft and arranged during engagement of said one end by said first stop to apply a counter force to said shaft in opposition to the force of said primary spring, a movable second stop projecting from said shaft, said movable second stop arranged to engage said one end of the secondary spring at angular positions of said shaft corresponding to said upper range of values, said movable stop upon engaging said one end of the secondary spring displacing the one end of said secondary spring from the first stop to remove the counter force applied to the shaft by said secondary spring, and said movable second stop arranged at angular positions of said shaft corresponding to said lower range of values to return the one end of said secondary spring into operative engagement with said first stop so that said secondary spring may reapply said counter force to said shaft in opposition to the primary spring force at angular positions of said shaft corresponding to said lower range of values.

2. Apparatus according to claim 1 including means to angularly adjust the second stop on the shaft to set the upper and lower ranges.

3. Apparatus according to claim 1 wherein means are provided to adjust said second stop relative to said first stop so as to prevent movement of said shaft within a predetermined range of values of the sensed condition intermediate the lower and upper ranges.

4. In a condition responsive apparatus, the combination comprising means for sensing a variable torque input condition, a yieldably restrained shaft angularly displaceable by said condition sensing means, means cooperating with said shaft for effecting a uniformly expanded indication of one range of values of the sensed condition and a uniformly compressed indication of another range of values of the sensed condition, said last-mentioned means including a primary spring operatively connected to said shaft to apply a force resiliently opposing angular movement thereof upon increase in the value of the sensed condition, a secondary spiral spring wound about said shaft, stop means to releasably engage one end of said secondary spiral spring, said secondary spiral spring having another end fixed to said shaft and arranged during engagement of said one end by said stop means to apply a resilient force to said shaft, said stop means arranged to engage said one end of the secondary spring at angular positions of said shaft corresponding to said other range of values and to disengage said one end of the secondary spring at angular positions of said shaft corresponding to said one range of values, means to angularly adjust the position of the stop means relative to said one end of the secondary spring to set the compressed and expanded range of values.

5. Apparatus according to claim 4 in which said primary spring is operable in both a lower and upper range of sensed condition values and said secondary spring is operable only in the lower range.

6. Apparatus according to claim 4 in which said primary spring is operable in both a lower and upper range of sensed condition values and said secondary spring is operable only in the upper range.

References Cited in the file of this patent

UNITED STATES PATENTS

| | | |
|---|---|---|
| 1,155,788 | Blaine | Oct. 5, 1915 |
| 2,549,754 | Bosch | Apr. 24, 1951 |
| 2,619,933 | Gordon | Dec. 2, 1952 |
| 2,674,447 | Sivacek | Apr. 6, 1954 |